US005905314A

United States Patent [19]

Roundtree

[11] Patent Number: 5,905,314

[45] Date of Patent: May 18, 1999

[54] AUXILIARY ELECTRIC DOOR LOCK ACTUATION SYSTEM

[76] Inventor: Duane Roundtree, 511 Jamaica, San Antonio, Tex. 78230

[21] Appl. No.: 08/568,256

[22] Filed: Dec. 6, 1995

[51] Int. Cl.[6] .......... B60R 25/00

[52] U.S. Cl. .......... 307/10.2; 70/237; 180/287

[58] Field of Search .......... 307/9.1–10.6; 180/287; 70/264, 237, 256, 276, 413, 277, DIG. 30; 335/205–207

[56] References Cited

U.S. PATENT DOCUMENTS

| | | | |
|---|---|---|---|
| 3,639,906 | 2/1972 | Tritsch | 70/277 |
| 3,785,188 | 1/1974 | Drathschmidt | 70/276 |
| 4,546,266 | 10/1985 | Zenick et al. | 307/10.2 |
| 4,744,231 | 5/1988 | Takagi et al. | 70/264 |
| 5,386,713 | 2/1995 | Wilson | 70/277 |
| 5,397,925 | 3/1995 | Carlo et al. | 307/10.3 |

*Primary Examiner*—Richard T. Elms
*Attorney, Agent, or Firm*—David G. Henry

[57] ABSTRACT

An auxiliary switching system for vehicles having power door lock systems. The system is for use primarily when drivers lock their keys in the vehicles. The system is electronically simple, and includes a magnetically actuated switch which is mounted in a secret, exteriorly accessible location on the vehicle. A switching module is slaved to the magnetically actuated switch and is integrated into the vehicles door lock system actuation circuit. A simple magnet trips the magnetically actuated switch which, in turn, actuates the switching module which, in turn, unlocks the vehicle's door locks. Between uses, the magnet is concealed at some place on the vehicle's exterior, such as on an inside surface of a bumper, or decorative, metallic vent.

1 Claim, 1 Drawing Sheet

AUXILIARY ELECTRIC DOOR LOCK ACTUATION SYSTEM

BACKGROUND OF THE INVENTION

1. Field of the Invention

The present invention relates to switching means, and more particularly to switches for actuating automobile electric door locking and unlocking circuitry.

2. Background Information

Locking one's keys in his/her car has always been a problem. Few people carry spare keys in their pant pockets, etc.

At one time, locking the keys in the car was the result of an affirmative act on the driver's part—locking and closing the door. With today's advanced alarm and door control systems, far less must happen in order for a driver to find his/her keys locked in the car. For example, one might close a car door with the keys still in the car just long enough to check a mail box, pay a gas station attendant, etc. only to find that the car's alarm system automatically actuated the electric locks and armed the alarm.

Other less likely, but documented cases involving keys being locked inside cars involved actuation of the locking mechanism by pets or very young children, both of whom were unable to intentionally re-actuate the system to unlock the car. A young child trapped inside a locked car represents an emergency by any definition, particularly if the car is running, or in direct Summer sunlight at which time interior temperatures of a car can quickly reach lethal levels. Pets have also died while locked inside cars.

Whatever the cause, the effect of having one's keys locked inside his/her car can represent anything from an inconvenience to a life threatening event. It is an inconvenience if one merely is delayed in leaving home, and must call a locksmith. It is a life threatening event if one is at a dark parking lot, and is being approached by potential muggers.

As previously mentioned, few drivers carry spare keys in their wallets or pockets. Leaving a key "hidden" at some location on the exterior of the vehicle is an obvious security risk (thieves seem to have a "sixth sense" about where home, car or business owners "hide" keys). Since alarm/lock actuators are usually attached to drivers' key rings, alarm actuators are not likely of much help when keys are locked inside a vehicle.

What is needed is an auxiliary mechanism by which an automobile driver may actuate the electric door locking system of his/her car. To avoid increasing the likelihood of car theft, such a mechanism, while remaining accessible from the exterior of a locked car, must be largely useless to would-be car thieves.

SUMMARY OF THE INVENTION

In light of the foregoing, it is an object of the present invention to provide a novel auxiliary automobile locking system actuator.

It is another object of the present invention to provide a novel auxiliary automobile locking system actuator for use in cases of keys being locked inside the automobile.

It is another object of the present invention to provide a novel auxiliary automobile locking system actuator for use in cases of keys being locked inside the automobile for obviating the dangers associated with a young child or infant being locked inside the car.

It is another object of the present invention to provide a novel auxiliary automobile locking system actuator which actuator facilitates the unlocking of a locked car having an electric door locking system without the benefit of keys or auto alarm actuators.

It is another object of the present invention to provide a novel auxiliary automobile locking system actuator which actuator facilitates the unlocking of a locked car having an electric door locking system requiring access only to a component which may readily be stowed on the exterior of the car.

It is another object of the present invention to provide a novel auxiliary automobile locking system actuator which actuator facilitates the unlocking of a locked car having an electric door locking system requiring access only to a first component which may readily be stowed on the exterior of the car, yet which is not readily usable by persons ignorant of the location of a second component which is positioned in a non visibly perceptible point on the car's body.

In satisfaction of these and related objectives, the present invention provides a novel auxiliary automobile locking system actuator which actuator facilitates the unlocking of a locked car having an electric door locking system. The present system includes two primary components: (1) a magnetically actuated switch which is wired into the circuit containing the switch(es) which unlock the locks of the automobile's electric door lock system; and (2) a magnet which actuates the magnetically actuated switch.

For security purposes, the method of adapting an automobile with the present auxiliary involves concealing the magnetically actuated switch at some point accessible from the car's exterior. The switch should be mounted to a non-metallic surface (inside a window, stop lamp lens, etc.). Metallic body parts will "mask" the magnetic interaction between the actuating magnet and the switch. While virtually any magnet will actuate the magnetically actuated switch, a magnet which is configured for affixation to an outer surface of the car is provided for the present system. Such a magnet is configured for stowage, for example, inside a bumper, a wheel well, etc.

With the present auxiliary switching system installed, car owners need no longer worry about locking their keys in their car with all that such might entail when it happens at the "worst possible time".

DETAILED DESCRIPTION OF THE PREFERRED EMBODIMENT

Figure 1:
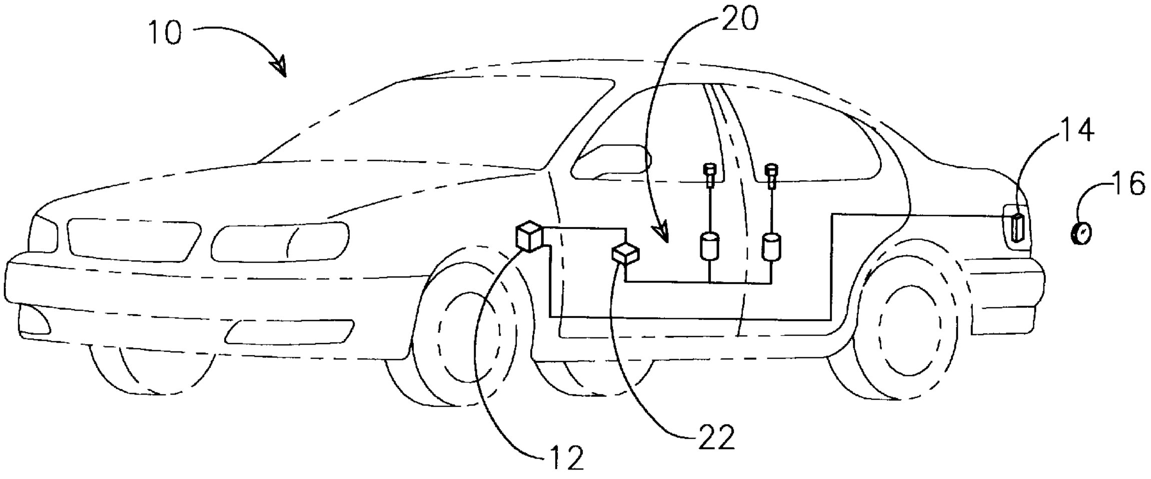
FIG. 1 is a perspective, schematic view of an automobile in which the embodying components of the present invention are installed.
Figure 2:
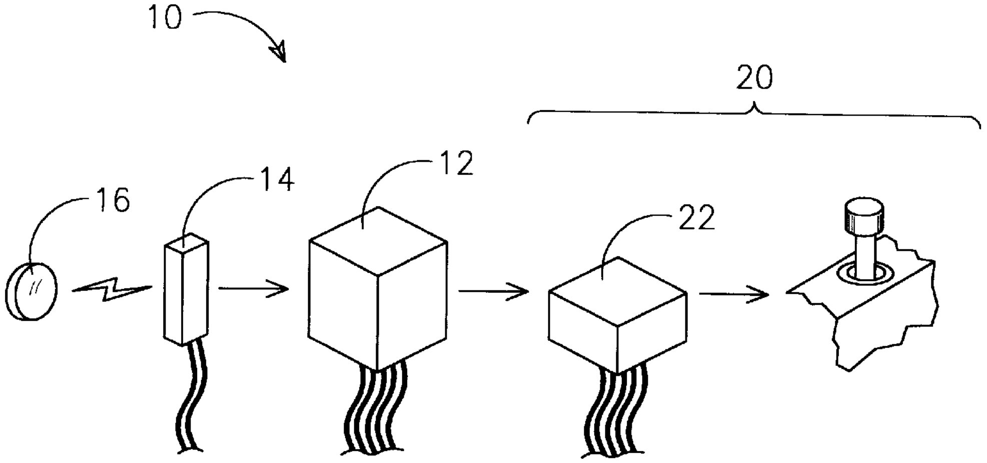
FIG. 2 is a schematic representation of the principle components of an embodiment of the present invention.

The electronic design of the present system 10 is straight forward. Installing the present system 10 amounts to simply adding, to the already present door lock actuating switches 22 in the door locking actuation circuit 20, one additional switching device 12. However, unlike the typically installed two or four door-mounted switches, and perhaps the radio activated switch associated with an alarm system, the switch 12 added in association with the present system 10 is actuated by simply juxtaposing a magnetically actuated switch 14 and a simple magnet 16. A remote switching module 12 is slaved to the magnetically actuated switch 14, the former being wired into the door lock actuation circuit 20 as described hereafter.

The remote switching module 12 in the preferred embodiment of the present system 10 is a switching module, Model No. VFA-85F11, by Potter & Brumfield. The magnetically actuated switch 14 which is mounted at some exteriorly accessible location, is a switch such as is used as door and window "sensors" for hardwired burglar alarm systems in homes and businesses. A magnet 16 as simple as a ¼" round magnet 16 such as is found on the back of "refrigerator magnets" will suffice to close the magnetically actuated switch.

Using the indicated parts (assuming the magnetically actuated switch has one orange and one yellow lead wire) installation of the present system 10 is according to the following instructions:

1. Choose a location to mount the activator switch 14. Try to select a location which conceals the activator switch 14 from both inside and outside the vehicle. (Do not mount on metal surfaces or the activator switch 14 will not "read" the energy from the magnet 16). Once the switch is mounted, route the orange and yellow wires to under the dash on the driver's side where the switching module 12 will be mounted. All the wiring you will need to access is commonly located in the driver side kick panel region.
2. Once the switching module 12 is secured under the dash, make the following connections:

SWITCHING MODULE

Red wire—constant source of positive 12 volts

Orange wire—connect to orange activator switch wire

NOTE: THE RED WIRE SHOULD BE PROTECTED BY A 10 AMP FUSE

3. Now you need to determine the type of door lock system the vehicle has. This is done most easily by accessing the wires connected to the back of the factory door lock switch. Remove this switch, if necessary, and using a 12 volt test probe or volt/ohm meter, check for one of the following system types:
   a. 3—wire negative pulse—this system 10 requires a momentary ground pulse applied to one of the 3 wires in order to unlock the doors. Making sure the doors are locked, touch each of the wires with a grounded test probe until the doors unlock. Once the factory unlock wire is identified, make the following connections:

SWITCHING MODULE

Yellow wire—connect to a stable ground

Blue wire—connect to factory unlock wire

NOTE: TO AVOID HAVING TO RUN WIRES FROM THE DOOR TO THE INSIDE OF THE VEHICLE, LOOK FOR THE SAME COLOR UNLOCK WIRE UNDER THE DASH OR KICK PANEL REGION.

Green wire—not used

ACTIVATOR SWITCH

Yellow wire—connect to yellow switching module wire b. 3—wire positive pulse—this system 10 requires a momentary 12 volt pulse applied to one of the 3 wires in order to unlock the doors. Using a grounded test probe or volt/ohm meter, determine which wire has 12 volts current when the factory switch is held in the unlock position.

NOTE: MAKE SURE THIS WIRE HAS 12 VOLTS ONLY WHEN THE FACTORY SWITCH IS IN THE UNLOCK POSITION.

Once the factory unlock wire is identified, make the following connections:

SWITCHING MODULE

Yellow wire—connect to red wire of switching module

Blue wire—connect to factory unlock wire

Green wire—not used

ACTIVATOR SWITCH

Yellow wire—connect to a stable ground c. 5—wire reversing polarity system—this system is similar to the 3-wire positive pulse system except for the following differences: Locate the wire at the factory switch which has 12 volts positive current when the switch is held in the unlock position. Cut this wire in two. To make sure you have the right wire, make sure you are not able to unlock any of the doors with the factory switch once you have cut it. Now, check to see which of the two halves has 12 volts positive current when the factory switch is held in the unlock position. This half is the "switch" side and the other side is the "activator" side. Once this is done, make the following connections:

SWITCHING MODULE

Yellow wire—connect to red switching module wire

NOTE: THE 10 AMP FUSE PROTECTING THE RED WIRE SHOULD BE UPGRADED TO A 20 AMP FUSE ON 5—WIRE SYSTEMS

Blue wire—connect to "activator" side of cut unlock wire

Green wire—connect to a stable ground

ACTIVATOR SWITCH

Yellow wire—connect to green switching module wire

4. Test the system 10 by locking the doors and passing one of the magnets 16 provided by the activator switch location. The doors should unlock immediately. If they do not, check all connections making sure they are correct and made securely.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An auxiliary electric door lock actuation system comprising:

a magnetically actuated switch mounted on a vehicle having a power door lock system, said magnetically actuated switch mounted in position which is spatially remote from any keyhole on said vehicle and positioned for actuation through juxtaposition of magnet means to that portion of said vehicle to which said magnetically actuated switch is mounted;

a switching module electrically connected with said magnetically actuated switch to define a first switchable circuit, said magnetically actuated switch serving as a switch in said first switchable circuit, said switching module integrated into a electric door lock actuation circuit whereby, when said magnetically actuated switch is tripped, said switching module actuates door unlocking means which are electrically integrated into said door lock actuation circuit for unlocking doors of said vehicle; and magnet means for tripping said magnetically actuated switch, said magnet means independent of any key intended for mechanical actuation of said vehicle's door locking system.

* * * * *